United States Patent [19]

Nakamura et al.

[11] Patent Number: 4,681,374
[45] Date of Patent: Jul. 21, 1987

[54] WHEEL SLIP CONTROL SYSTEM

[75] Inventors: Kazumasa Nakamura, Okazaki; Ikuya Kobayashi; Takahiro Nogami, both of Toyota; Akira Shirai, Toyoake; Kaoru Ohashi, Okazaki; Yoshihisa Nomura, Toyota, all of Japan

[73] Assignee: Toyota Jidosha Kabushiki Kaisha, Toyota, Japan

[21] Appl. No.: 790,453

[22] Filed: Oct. 23, 1985

[30] Foreign Application Priority Data

Oct. 30, 1984 [JP] Japan ................... 59-228537

[51] Int. Cl.$^4$ ............................................. B60T 3/08
[52] U.S. Cl. ..................................... 303/106; 303/96; 180/197
[58] Field of Search ............... 303/96, 100, 105, 106, 303/DIG. 4, 110, 111, 113, 115, 116, 119, 84 A; 188/181 A, 181 C, 181 R; 180/197; 364/426

[56] References Cited

U.S. PATENT DOCUMENTS

| | | | |
|---|---|---|---|
| 3,503,655 | 3/1970 | Heimler | 303/84 A |
| 3,520,576 | 7/1970 | Okamoto et al. | 188/181 A |
| 3,582,152 | 6/1971 | Burckhardt | 188/181 A |
| 3,666,328 | 5/1972 | Williams | 303/115 |
| 3,779,331 | 12/1973 | Burckhardt et al. | 180/197 |
| 3,802,529 | 4/1974 | Burckhard et al. | 180/197 |
| 3,893,535 | 7/1975 | Burckhard et al. | 180/197 |
| 3,963,277 | 6/1976 | Chiba | 303/113 |
| 3,993,364 | 11/1976 | Chiba et al. | 188/181 A |
| 4,509,802 | 4/1985 | Solleder et al. | 180/197 |
| 4,554,990 | 11/1985 | Kaniya et al. | 180/197 |

FOREIGN PATENT DOCUMENTS 0002962 9/1984 Japan .

Primary Examiner—John W. Caldwell, Sr.
Assistant Examiner—Alvin Oberley
Attorney, Agent, or Firm—Cushman, Darby & Cushman

[57] ABSTRACT

A wheel slip control system used for a vehicle comprising: a pressure source selector being informed of a first pressure of a first pressure source and a second pressure of a second pressure source and adapted to select one of the first and second pressure source, a slip controller receiving a first adjustment signal for anti-skid control to adjust the first pressure provided by the pressure source selector or receiving a second adjustment signal for traction control to adjust the second pressure provided by the pressure source, selector a brake slip detector detecting the state of slipping of wheels during a braking operation of the vehicle and producing a brake slip signal, an acceleration slip detector detecting the state of slipping of wheels during an accelerating operation of the vehicle, a second throttle valve being placed at an intake air path provided with a first throttle valve interlocked to an acceleration increase member; and an electronic controller receiving the brake slip signal and providing the first adjustment signal for the slip controller so that the driven wheel speed is within a first predetermined range, receiving the acceleration slip signal and providing the second adjustment signal for the slip controller so that the driven wheel speed is within a first predetermined range, and providing the third adjustment signal to a driving member for driving the second throttle valve for the slip controller so that the driven wheel speed is within a second predetermined range.

9 Claims, 8 Drawing Figures

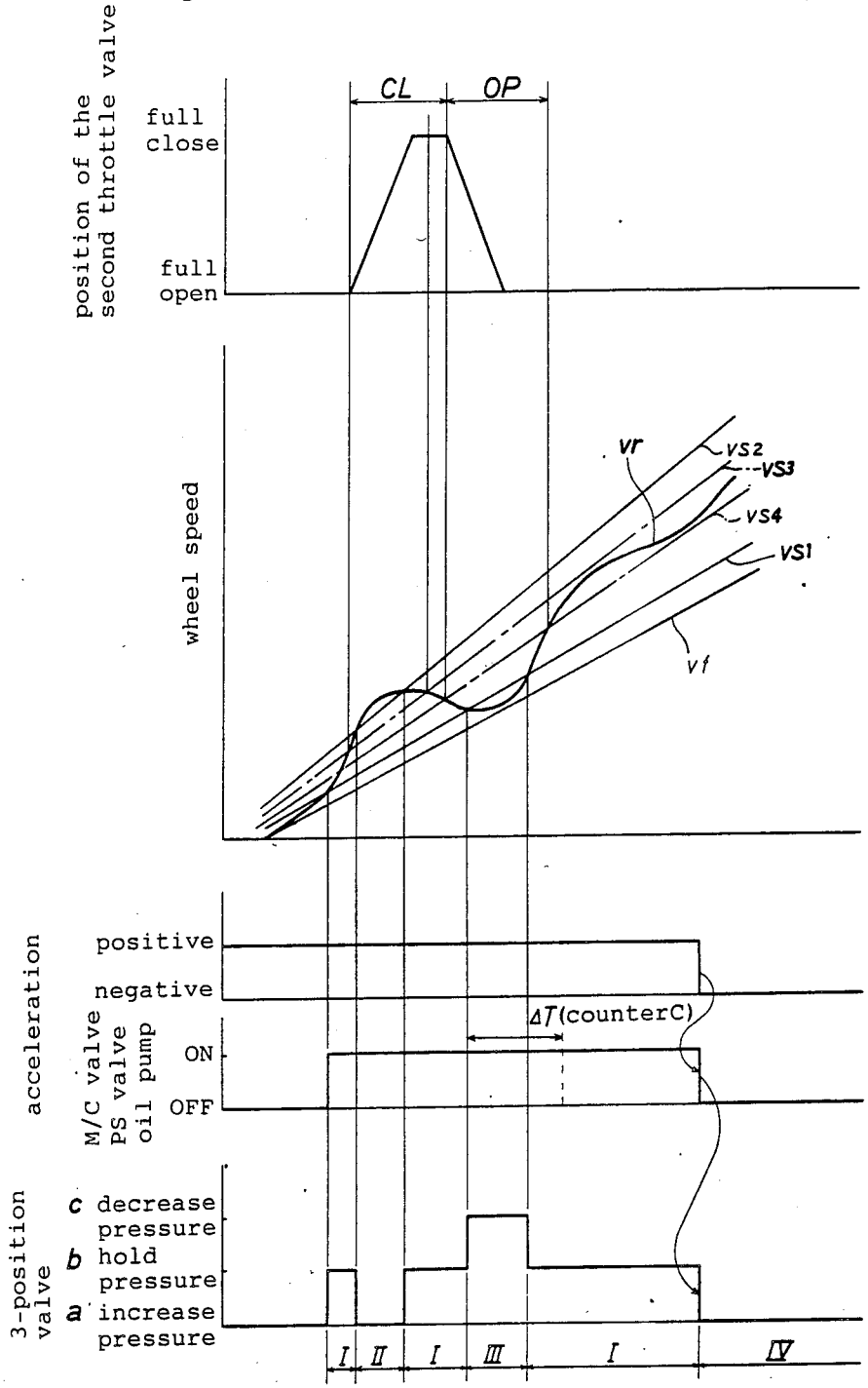

WHEEL SLIP CONTROL SYSTEM

BACKGROUND OF THE INVENTION

1. Technological Field

The present invention relates to a wheel slip control system for a vehicle, operable so as to control the rotation of the driven wheels to control the power of internal combustion engine, as well as control the braking system for driven wheels during an acceleration slip.

2. Prior Art

There have been known various kinds of anti-skid control systems (for example, Published unexamined patent application sho No. 59-2962 "Hydraulic Anti-skid Control System") for vehicles which control the slip of the wheels during braking and acceleration operation. On the other hand, another slip control system for vehicles which conducts traction control for improving running stability, acceleration, etc. has been considered. In such a device, idle running of driven wheels is prevented and rotation of driven wheels is controlled so as to maximize the frictional force between the tire and road surface during acceleration operation.

As for the latter traction control system, it is considered that the control of internal combustion engine power and that of rotation of driven wheels are carried out by adjusting, e.g., the ignition timing and the fuel injection amount when the degree of driven wheel slip is found to exceed a predetermined value.

However, the wheel slip control systems mentioned above are still inert, and the following problems remained unsolved.

The conventional wheel slip control systems aim at the prevention of slip during acceleration by reducing the fuel injection amount or setting a time lag against a change in the ignition timing so as to control the output of the internal combustion engine. In this case, there is a problem that the control capacity is limited, due to the necessity of taking preventive measures against abnormal vibration or fire due to abrupt changes in the operating conditions of the engine.

On the other hand, when the intake air amount is controlled, the ignition timing and the fuel injection amount, etc. are determined in accordance with it. Therefore, the output of internal combustion engine can be controlled smoothly to improve the drivability. But if the opening position of the throttle valve interlocked to the accelerator pedal, is controlled against the commanded position of the pedal commanded by being stepped on, some problems may occur. For example, discomfort like kickback to the driver, or incapability of keeping stability in case of failure with control parts of the throttle valve may exist.

In addition, another problem, that is, the rotation of driven wheels cannot be controlled immediately because of the bad responsiveness, should be pointed out when the output of internal combustion engine is used for controlling the rotation of driven wheels in the case above. Accordingly, it is possible to control the rotation of driven wheels directly by using the brake system mounted on the vehicle, when the slip of driven wheels occurs during acceleration operation and the rotation of them must be controlled instantly. But a special brake system will be required to control the rotation of driven wheels by using the brake system only. Namely, if the driving force is great, for example, when the gear position of transmission is set at the first speed, the special brake system which produces greater brake force will be necessary to give the corresponding brake force against the driving force. The conventional brake system may not work well. Also, the pressure source will be required for the purpose of increasing braking pressure supplied to the braking cylinder equipped with the driven wheels of the control system for vehicles. Therefore, an oil pump must be added to the conventional vehicles in order to activate the brake for throttle control (A small-type pump is acceptable).

SUMMARY OF THE INVENTION

The objective of the present invention is to solve the above-mentioned problems and offer a wheel slip control system capable of carrying out the fine control without any decrease in drivability and safety of vehicles as well as any delay in control when the slip of driven wheels occur during acceleration operation.

Another objective of the present invention is to offer a wheel slip control system wherein the braking force of wheels, including driven wheels, is controlled by braking means, so-called anti-skid control system in braking and traction control in accelerating and other pressure sources mounted on vehicles and the output of internal combustion engine is controlled by the second throttle valve which controls the intake air amount in longer period, thus the driven wheels can be operated with the most suitable driving force by controlling the driving force of driven wheels to prevent the occurrence of excessive slip like locking, accompanying skidding, etc.

It is another further objective of the present invention to offer a wheel slip control system wherein the necessary braking force for braking means is minimized by controlling the output of internal combustion engine as well as braking force, therefore, the system can be reduced in size and weight so as to save the fuel consumption.

The other objective of the present invention is to offer a wheel slip control system wherein the traction control system is easily added to vehicles equipped with the anti-skid control system and other pressure sources, as the device and constitution of the anti-skid control system are simplified by utilizing the hydraulic system, which leads to the capability of conducting the fine control of braking force and minimizing the necessary devices used for traction control only.

In order to achieve the above objectives thereby to solve the afforementioned prior art problems, the inventive wheel slip control system features comprise as shown in FIG. 1.

A wheel slip control system used for vehicle comprising:

(a) a pressure source selection means M3 monitoring a first pressure of a first pressure source M1 and a second pressure of a second pressure source M2 to measure the difference between two pressures, and adapted to select one of said first and second pressure sources depending on the measured differential pressure;

(b) a slip control means M5 receiving a first adjustment signal for anti-skid control to adjust the first pressure provided by said pressure source selection means M3 or receiving a second adjustment signal for traction control to adjust the second pressure provided by said pressure source selection means M3 and after adjustment operating to suppress slipping of wheels including driven wheels M4;

(c) a brake slip detection means M6 detecting the state of slipping of a driven wheel M4 during a braking operation of the vehicle and producing a brake slip signal representing the state of slipping;

(d) an acceleration slip detection means M7 detecting the state of slipping of a driven wheel M4 during an accelerating operation of the vehicle;

(e) a second throttle valve M10 provided to intake air path 3 where a first throttle valve M9 is interlocked to a vehicle speed increase means M8;

(f) an electronic control means M11 receiving said brake slip signal and providing the first adjustment signal based on said received signal for said slip control means M5 so that the driven wheel speed is within a first predetermined range, receiving said acceleration slip signal and providing the second adjustment signal based on said received signal for said slip control means M5 so that the driven wheel speed is within a second predetermined range, and outputting a third adjustment signal for traction control to a operating means for said second throttle valve M10 so that the driven wheel speed is within a third predetermined range.

The first pressure source M1 means indicates the pressure as obtained from a brake pedal directly or indirectly by driver. The artificial pressure amplified by machinery, like powerbrake, may be acceptable.

Also, the second pressure source M2 indicates any pressure sources mounted on vehicles, for example, the pressure sources for anti-skid or power steering, etc.

The pressure source selection means M3 may have a constitution which gives priority to the source of higher pressure. Thus, the combination of check valves and the use of a shuttle valve may be adopted. As a matter of course, the constitution which selects the suitable source compulsorily in accordance with the state of slip control of vehicle may be allowed.

The brake slip detection means M6 detects the slip condition of driven wheels M4 during braking operation, e.g. one judges the slip when the difference between vehicle speed and driven wheel speed exceeds a predetermined value, or the other detects the slip when the detected acceleration of driven wheels lowers a predetermined negative value.

On the other hand, an acceleration slip detection means M7 detects the slip (lock) of driven wheels during accelerating operation, e.g., one decides the slip when the difference between vehicle speed and driven wheel speed exceeds a predetermined value or the other detects the slip in accordance with the difference of speed (number of rotations) between driven wheels and non-driven wheels, further, the other judges the slip when acceleration of rotations of driven wheels is above a predetermined value.

It is possible for said brake slip detection means M6 and said acceleration slip detection means M7 to have the same constitution if only the parameter is changed. As the brake slip and the acceleration slip do not occur concurrently, there are no problems for using the system in common. Thus, that has such a remarkable merit as being capable of simplifying the system and the constitution.

An electronic control means M11 inputs signals from said acceleration slip detection means M7 and said brake slip detection means M6 and controls the hydraulic pressure of said slip control means M5 and the position of said second throttle valve M10. It is constituted so as to control the position of said second throttle valve M10 by actuator, etc. as well as to decrease, hold or increase the hydraulic pressure by 3-position 3-port valve, etc. Also, such a constitution as controlling the position of said 3-position 3-port valve and the operation amount of said actuator by microcomputer in addition to said brake slip detection means M6 and said acceleration slip detection means M7 or having discrete circuit construction for every means.

In the wheel slip control system as mentioned above, a part of so-called anti-skid brake control system, which controls the brake of wheels by changing the hydraulic pressure of hydraulic pressure system in accordance with the first pressure source operated by driver when the slip condition of vehicle is detected during braking operation of a vehicle, is used in common. In addition, when the slip condition is detected during acceleration of the vehicle, using the second pressure source mounted on the vehicle separately from the first one as the pressure source of the hydraulic pressure system for said brake control means, the position of said second throttle valve as well as the pressure of the hydraulic pressure system are controlled.

Namely, when the slip occurs during acceleration operation in the system, the suitable brake force is given to the wheels by pressure of the second pressure source and the output of internal combustion engine which operates the driven wheel is controlled by adjusting the intake air amount with said second throttle valve. Therefore, the quick response of traction control can be secured by the former and the unnecessary power from the internal combustion engine can be reduced by the latter when the traction control is conducted. In other words, the economic efficiency and the durability are satisfied.

BRIEF DESCRIPTION OF THE DRAWINGS

FIG. 7 is a timing chart showing, as an example, the control operation of the second embodiment;

DESCRIPTION OF THE PREFERRED EMBODIMENT

Embodiments of the present invention will now be described with reference to the drawings.

Figure 1:
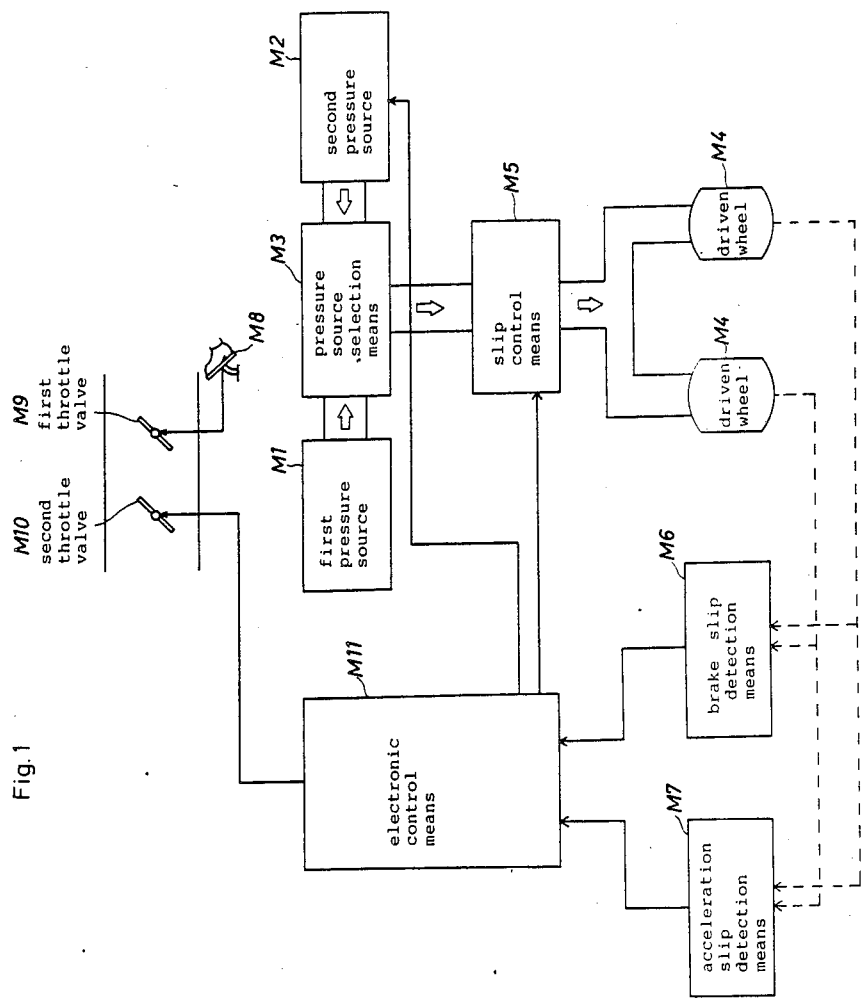
FIG. 1 is a general block diagram according to the invention slip control system.
Figure 2:
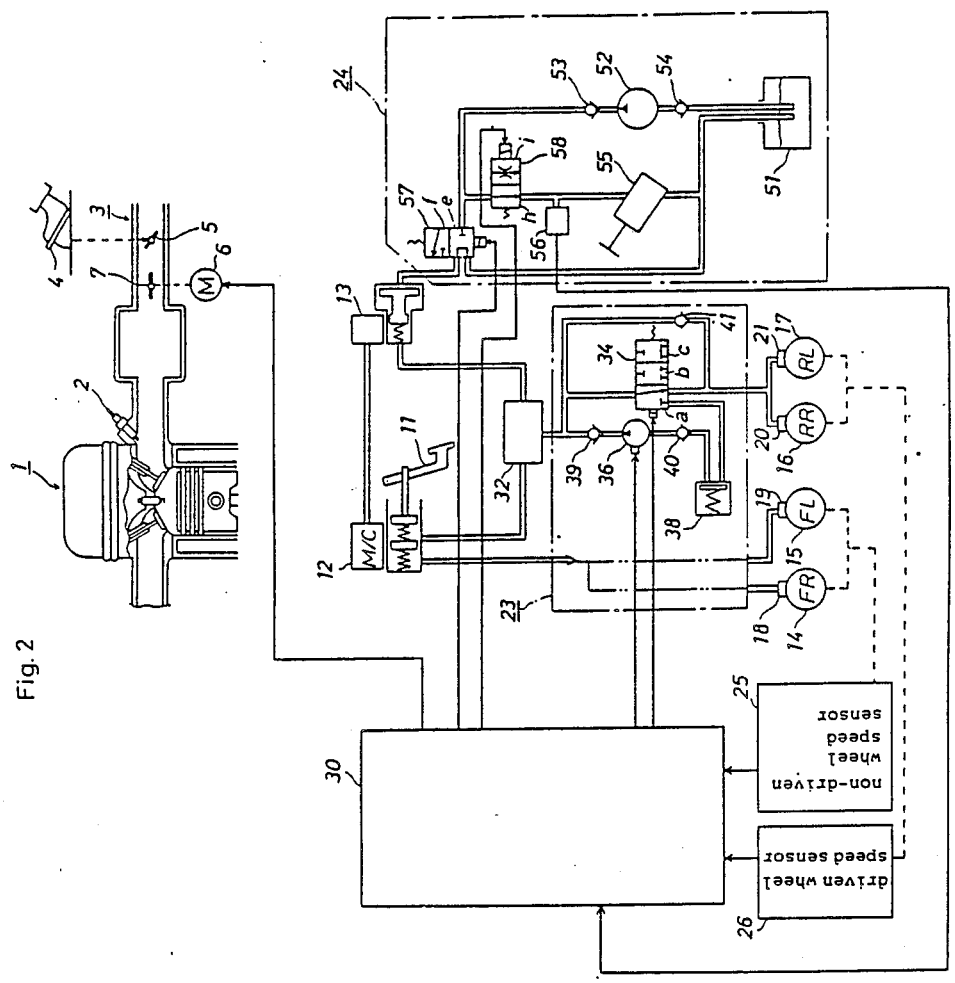
FIG. 2 is a schematic block diagram mainly showing the hydraulic system of the wheel slip control system embodying the first embodiment of the present invention.

In FIG. 2 showing generally a first embodiment of the inventive wheel slip control system, numeral 1 shows an internal combustion engine, 2 shows a fuel injection valve, 3 shows an intake air path, the intake air path 3 is provided with a first throttle valve 5 which interlocks to an accelerator pedal 4 and a second throttle valve 7 which is driven by a DC motor 6 so as to adjust the intake air amount. Normally, said second throttle valve 7 is fully opened. It is controlled from the full open to the full closed positions so as to control the power of the internal combustion engine for the traction control only. The slip control is executed when the valve is half-opened.

The arrangement also includes a brake pedal 11, a brake master cylinder 12 serving as the first pressure source for providing a brake hydraulic pressure in response to a displacement of the brake pedal 11, a sub-master cylinder 13 serving as the second pressure source for providing a brake hydraulic pressure derived from the power steering hydraulic system upon detection of an acceleration slip as described later, non-driven right and left wheels 14 and 15 of the vehicle, driven right and left wheels 16 and 17, wheel cylinders 18~21 provided for the wheels 14~17, a hydraulic system 23 used for anti-skid control, a power steering hydraulic system 24 for both anti-skid and traction controls, a non-driven wheel speed sensor 25 generating a pulse signal at frequencies in proportion to the rotational speed of the non-driven wheels 14 and 15, a driven-wheel speed sensor 26 generating a pulse signal at frequencies in proportion to the rotational speed of the driven wheels 16 and 17, and an electronic control circuit 30 implementing anti-skid control and traction control as well by controlling the hydraulic system 23 and 24.

The brake master cylinder 12 is of a tandem master cylinder assembly, supplying a brake oil pressure to the wheel cylinders 18 and 19 on the non-driven wheels 14 and 15 in one hydraulic system, and to the wheel cylinders 20 and 21 of the driven wheels 16 and 17 in another. The brake oil pressure produced by the sub-master cylinder 13 is used for the braking of driven wheels 16 and 17, and as to which of this brake hydraulic pressure or that produced by the brake master cylinder 2 is supplied by way of the anti-skid hydraulic system 23 to the wheel cylinders 20 and 21 is determined by a change valve 32 serving as the pressure source selection means. The change valve 32 has the structure of a shuttle valve, supplying the higher of the above two hydraulic pressures to the anti-skid hydraulic system 23.

The anti-skid hydraulic system 23 has major hydraulic paths for supplying the pressure from the change valve 32 to the wheel cylinders 20 and 21 via a 3-position valve 34, and operates to increase the pressure by means of an oil pump 36 and hold or decrease (release the pressure to a reservoir 38) depending on the position of the 3-position valve 34. The system 23 further includes check valves 39, 40 and 41, the hydraulic path via the valve 41 being used to decrease the pressure (decrease the braking force) by the operation of the brake pedal when the 3-position valve 34 is set at "hold" position. The 3-position valve 34 is operated by the electronic circuit 30, and positions a, b and c in FIG. 2 correspond to "increase pressure", "hold pressure" and "decrease pressure", respectively.

Next, the power steering hydraulic system 24 will be described. The power steering hydraulic system 24 consists of an oil pump 52 for pumping up the hydraulic oil used in the system from a reservoir tank 51, check valves 53 and 54 for conducting the oil flow in one way, a steering gear box 55, an oil pressure switch 56 which turns on (low level) when the oil pressure in the steering gear box 55 increases due to steering operation, a 2-position valve 57 (will be termed M/C up-pressure valve hereinafter) having e position for supplying the oil pressure increased by the oil pump 52 (will be termed steering oil pressure hereinafter) only to the power steering hydraulic system 24 and position f for supplying the oil to both of the system 24 and the traction control sub-master cylinder 13, and 2-position valve 58 (will be termed PS up-pressure valve hereinafter) having position h for supplying the hydraulic oil pumped by the oil pump 52 directly to the steering gear box 55 and position i for supplying the hydraulic oil with increased pressure to the gear box 55. The position of the oil pressure switch 56 is informed to the electronic control circuit 30, and the M/C up-pressure valve 57 and PS up-pressure valve 58 are controlled by the electronic control circuit 30.

Figure 3:
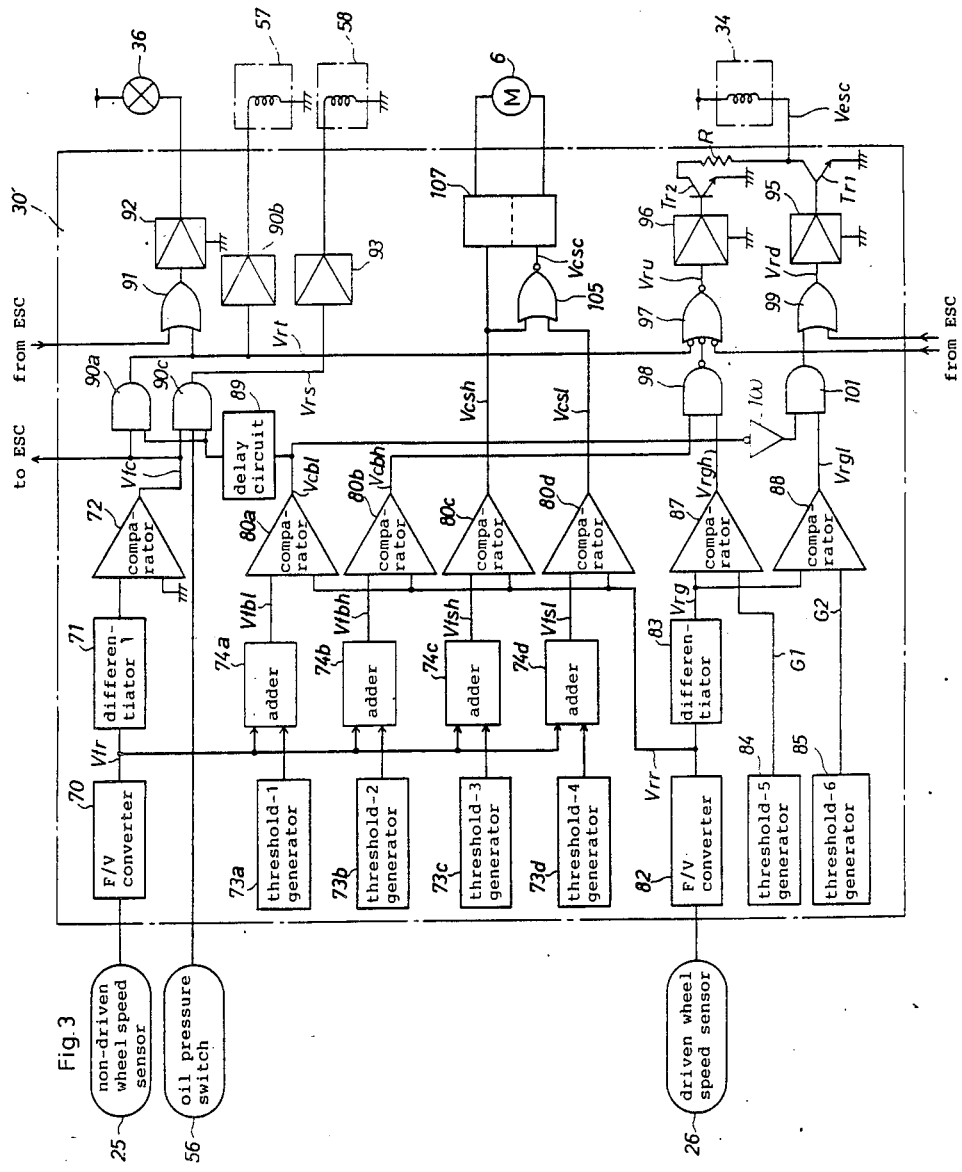
FIG. 3 is a schematic block diagram showing the traction control section 30' of the electronic control circuit 30 in FIG. 2 according to the first embodiment.

Next, a section 30' of the electronic control 30 for implementing traction control will be described with reference to FIG. 3. Besides the traction control circuit 30', the electronic control circuit 30 includes the anti-skid control circuit (ESC), but this section unrelated directly to the present invention will be disregarded in the following description.

Briefly, the traction control circuit 30' operates to receive the pulse signal from the non-driven wheel speed sensor 25 on an F/V converter 70, differentiate its voltage output Vfr by a differentiator 71 to obtain the acceleration of the vehicle, and compare the differentiated output with a zero level by a comparator 72 to obtain a signal Vfc indicative of as to whether the vehicle is in acceleration or deceleration. The signal Vfc is sent to the anti-skid control circuit ESC, which is activated when Vfc is at a low level.

Based on the signal Vfr representing the nondriven wheel speed, a threshold-1 generator 73a and an adder 74a in unison produce the first slip threshold level Vfbl, and a threshold-2 generator 73b and an adder 74b in unison produce the second slip threshold level Vfbh, a threshold-3 generator 73c and an adder 74c in unison produce the third slip threshold level Vfsh, a threshold-4 generator 73d and an adder 74d in unison produce the fourth slip threshold level Vfsl.

These voltage levels are compared by comparators 80a, 80b, 80c and 80d respectively, with the voltage signal Vrr which is derived from the pulse signal generated by the driven wheel sensor 26 and converted into voltage by an F/V converter 79, and four slip threshold signals Vcbl, Vcbh, Vcsh and Vcsl are obtained. The relationship among those signals is as follows.

$$Vfbh > Vfsh > Vfsl > Vfbl$$

Figure 4:
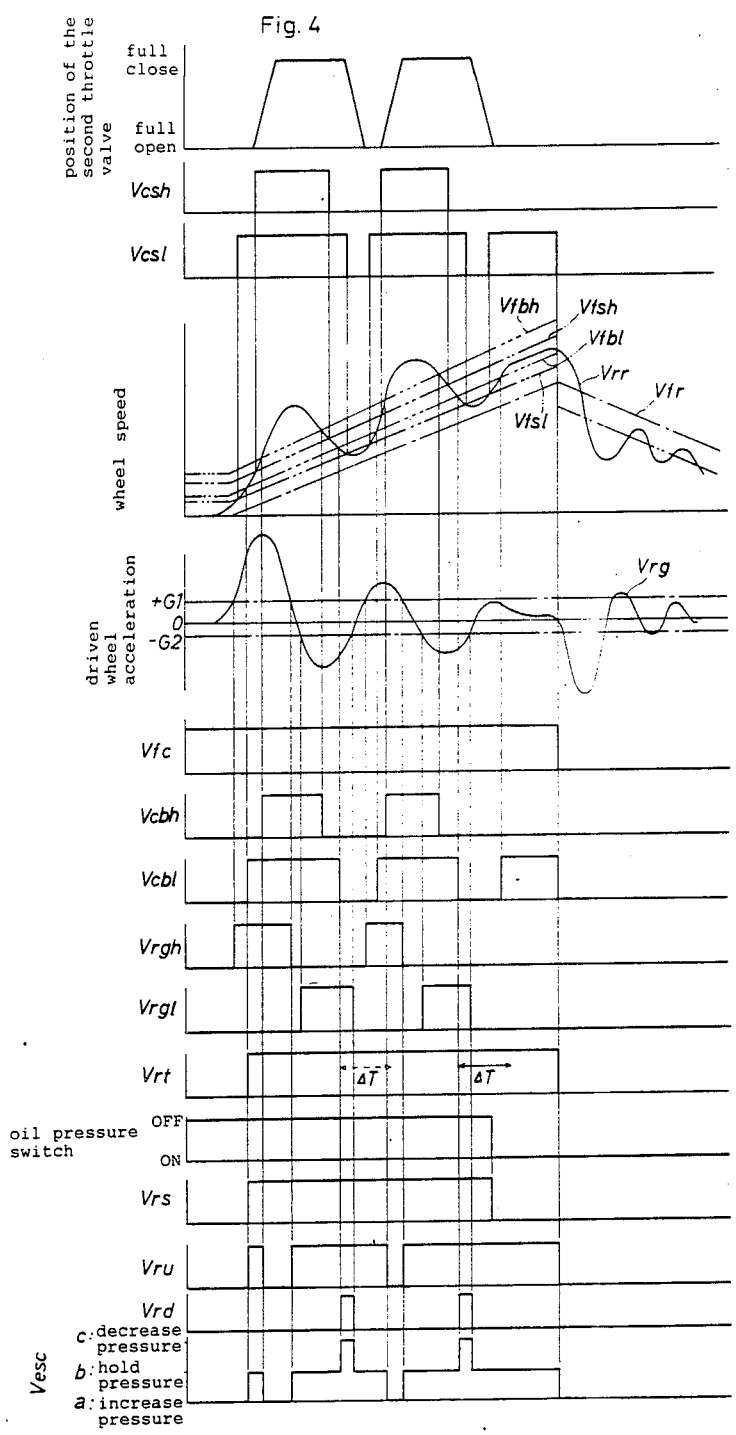
FIG. 4 is a timing chart showing, as an example, the control operation of the first embodiment.

As explained later in FIG. 4, the first and second slip threshold signals, Vfbh and Vfbh, are employed as threshold levels for controlling the braking force by means of said anti-skid hydraulic system 23 and the third and fourth slip threshold signals, Vfsh and Vfsl, as threshold level for controlling intake air amount of said internal combustion engine 1 by means of said second throttle valve 7. In addition, the first two signals indicate comparisons of the driven wheel speed (Vrr) with the first threshold level Vcbl and second threshold level Vcbh provided based on the non-driven wheel speed (Vfr) as shown in FIG. 4. The fourth slip threshold signal Vfbl gives a timing for the preparation of traction control, while the third slip threshold signal Vfbh gives a timing for carrying out traction control by increasing the brake oil pressure.

Also, the third slip threshold signal Vcsh generated by comparing the third slip threshold level Vfsh with the driving wheel speed indicates the timing when said throttle valve 7 is driven toward closing position by operating said motor 6 in normal direction. On the other hand, the fourth slip threshold signal Vcsl generated by comparing the fourth slip threshold level Vfsl with the driven wheel speed indicates the timing when said throttle valve 7 is driven toward opening position by operating said motor 6 in the opposite direction.

The traction control circuit 30' further operates to differentiate the signal Vrr representing the driven wheel speed to obtain a signal Vrg representing the acceleration of the driven wheels 16 and 17. The signal Vrg is compared with an output signal G1 from a threshold-5 generator 84 and an output signal G2 from a threshold-6 generator 85 by comparators 87 and 88, respectively, and the first slip control signal Vrgh and second slip control signal Vrgl are obtained.

The above three signal processing systems perform traction control as shown in FIG. 4.

In operation, when the vehicle accelerates to have a high Vfc signal, a lower slip threshold signal Vfbl goes high, causing a delay circuit 89 formed of a monostable multivibrator to produce a high output, and a 2-input AND gate 90a produces a high output Vrt as shown in FIG. 4. This signal goes through a 2-input OR gate 91 and an amplifier 92 to activate the oil pump 36 in the anti-skid hydraulic system 23 and, at the same time, goes through an amplifier 90b to switch the M/C up-pressure valve 57 to position f so that an oil path for conducting the power steering oil pressure to the sub-master cylinder 13 is formed. In another condition in which the oil pressure switch 56 is at a high level added to the above condition, a 3-input AND gate 90c provides an output Vrs, and when the Vrs becomes high, it goes through an amplifier 93 to switch the PS up-pressure valve 58 to position i and the steering gear box 55 is throttled and the power steering hydraulic pressure is conducted to the sub-master cylinder 13. The purpose of entering the output of the oil pressure switch 56 to the 3-input AND gate 90c is to switch the PS up-pressure valve 58 so as to prevent an unnecessary increase in the oil pressure which is raised automatically when the steering wheel is turned during traction control operation. The arrangement also works to supply the oil pressure to the power steering system in precedence over the traction control system.

The 3-position valve 34 in the anti-skid hydraulic system 23 has its three positions a, b and c controlled in response to the state of a transistor Tr1 driven by the output of an amplifier 95 and the state of a transistor Tr2 provided with a current limiting resistor R and driven by the output of another amplifier 96. The valve position is determined b the combination of the transistor outputs as follows.

| Tr1 | Tr2 | Valve Position | Brake Oil Pressure |
| --- | --- | --- | --- |
| OFF | OFF | a | Increase |
| OFF | ON | b | Hold |
| ON | ON | c | Decrease |

The amplifier 96 for driving the transistor Tr2 receives the output Vru of a 3-point AND gate 97, which signal Vru is determined by the logical sum of the output of a 2-point NAND gate 98 receiving the upper slip threshold signal Vcbh and first slip control signal Vrgh, the signal Vrt, and the control signal from the anti-skid control circuit (ESC), as shown in FIG. 4. During which, the amplifier 95 for driving the transistor Tr1 receives the output signal Vrd of a 2-input OR gate 99, which signal Vrd is determined by the logical sum of the output of a 2-input AND gate 101 receiving the lower slip threshold signal Vcb1 inverted by an inverter 100 and the second slip control signal Vrgl, and the input signal from the ESC.

On the other hand, said second throttle valve 7 is controlled as follows by the third and fourth slip threshold signals Vcsh and Vcsl respectively. When the third and fourth slip threshold signals are in low level, the output of a 2-input NOR gate 105 Vcsc becomes high level and a normal-reverse amplifier 107 feeds the current so as to operate said motor 6 in the opposite direction until said throttle valve 7 is fully opened. Consequently, said second throttle valve 7 is fully opened and the intake air amount is controlled by said first throttle valve 5 interlocked to said accelerator pedal 4. When the fourth slip threshold signal Vcsl is high in level, the output of said 2-input NOR gate 105 Vcsc becomes low level, thus, said normal-reverse amplifier 107 does not supply the power to said motor 6. Next, when the third slip threshold signal Vcsh is in high level, the output of said 2-input NOR gate 105 Vcsc becomes low level, then said normal-reverse amplifier 107 supplies the power in the opposite direction compared with the former case so as to operate said motor 6 in normal direction until said second throttle valve 7 is fully closed.

As a result of the foregoing arrangement of this embodiment, (A) When the vehicle accelerates as detected on the non-driven wheels 14 and 15, the power steering oil pressure is high enough, the control operation proceeds as follows:

(1) When the driven wheel speed Vrr has exceeded the lower threshold level Vfb1 based on the non-driven wheel speed, the oil pump 36 in the anti-skid hydraulic system 23 is activated, and the M/C up-pressure valve 57 and PS up-pressure valve 58 in the power steering hydraulic system 24 are switched to positions f and i, respectively;

(2) When the driven wheel speed Vrr has exceeded the third slip threshold level Vfsh based on the non-driven wheel speed, the power of said internal combustion engine 1 is judged as unnecessarily high, and is controlled by operating said motor 6 in normal direction and adjusting the position of said second throttle valve 7 toward the full closed position.

(3) If the driven wheel speed Vrr exceeds the upper threshold level Vfbh based on the non-driven wheel speed and at the same time the driven wheel acceleration Vrg exceeds a certain reference level G1, the 3-position valve 34 in the anti-skid hydraulic system 23 is set to position a (increase pressure) so as to increase the braking force of the driven wheels 16 and 17;

(4) If the driven wheel speed Vrr is below the lower threshold level vfb1 based on the non-driven wheel speed and at the same time the driven wheel acceleration Vrg is below a certain reference level G2 (a negative value), the 3-position valve 34 is set to position c (decrease pressure) so as to reduce the braking force;

(5) If the driven wheel speed Vrr is below the fourth slip threshold level Vfsl based on the non-driven wheel speed, the control of power of said internal combustion engine 1 is regarded as unnecessary and the power is increased by operating said motor 6 in reverse direction and controlling the position of said second throttle valve 7 toward the full open; and (6) The control is conducted so as to hold the braking force with the position of said 3-position valve 34 set at position b (hold) under the conditions other than (3) and (4) mentioned above. On the other hand, the power of said internal combustion engine 1 is held without controlling the position of said second throttle valve 7 under the conditions except (2) and (5) mentioned above.

(B) When a steering operation takes place, causing the oil pressure in the steering gear box 55 to increase with the oil pressure switch 56 operating ON, the PS up-pressure valve 58 is restored to position h and the 3-position valve 34 is set to position a (increase pressure). Accordingly, if the driven wheel 16 or 17 slips during the acceleration of the vehicle, the existing anti-skid hydraulic system sourced by the power steering hydraulic pressure is used to brake the driven wheels 16 and 17 so as to prevent a slip running etc., whereby the driven wheels 16 and 17 are exerted to produce an optimal traction force.

Also, in view of the power of said internal combustion engine 1 being decreased by the second throttle valve 7, it is possible to prevent the lock of the driven wheels 16 and 17, etc. and give them the optimum driving force by traction control. Therefore, as a whole, the traction control with the good efficiency can be achieved, employing the braking system in accordance with the hydraulic pressure of the anti-skid hydraulic system 23 for the quick response, and the second throttle valve 7 for controlling the rotation in comparatively longer period, respectively.

Additionally, as the power of the internal combustion engine 1 is controlled by the second throttle valve 7, the necessary braking force for traction control is minimized and a reduction of the hydraulic system in size and weight becomes possible. Also, the fuel consumption is improved because no extra fuel is supplied to the internal combustion engine 1 when the braking force is generated, and at an same time, the exothermic condition of the brake system which supplies the braking force can be prevented.

This traction control is easily implemented without the need of a specialized hydraulic system and devices, but by utilization of the hydraulic system used for the anti-skid operation, the 3-position valve 34 used therein, and the power steering hydraulic system for obtaining the braking oil pressure independently of the driver's action. On this account, traction control can be established merely through a little modification for the piping and replacement of the electronic control circuit 30 for a vehicle which already installs the anti-skid control and power steering systems. It should be noted in FIG. 3 that the remaining one input to the 2-input OR gates 91 and 99 and the 3-point AND gate 97 respectively and to allow the anti-skid control circuit (ESC) to control the 3-position valve 34 and oil pump 36. Since anti-skid control and traction control do not take place concurrently, these systems can be shared by separate purposes through a simple logical sum process.

Figure 5:
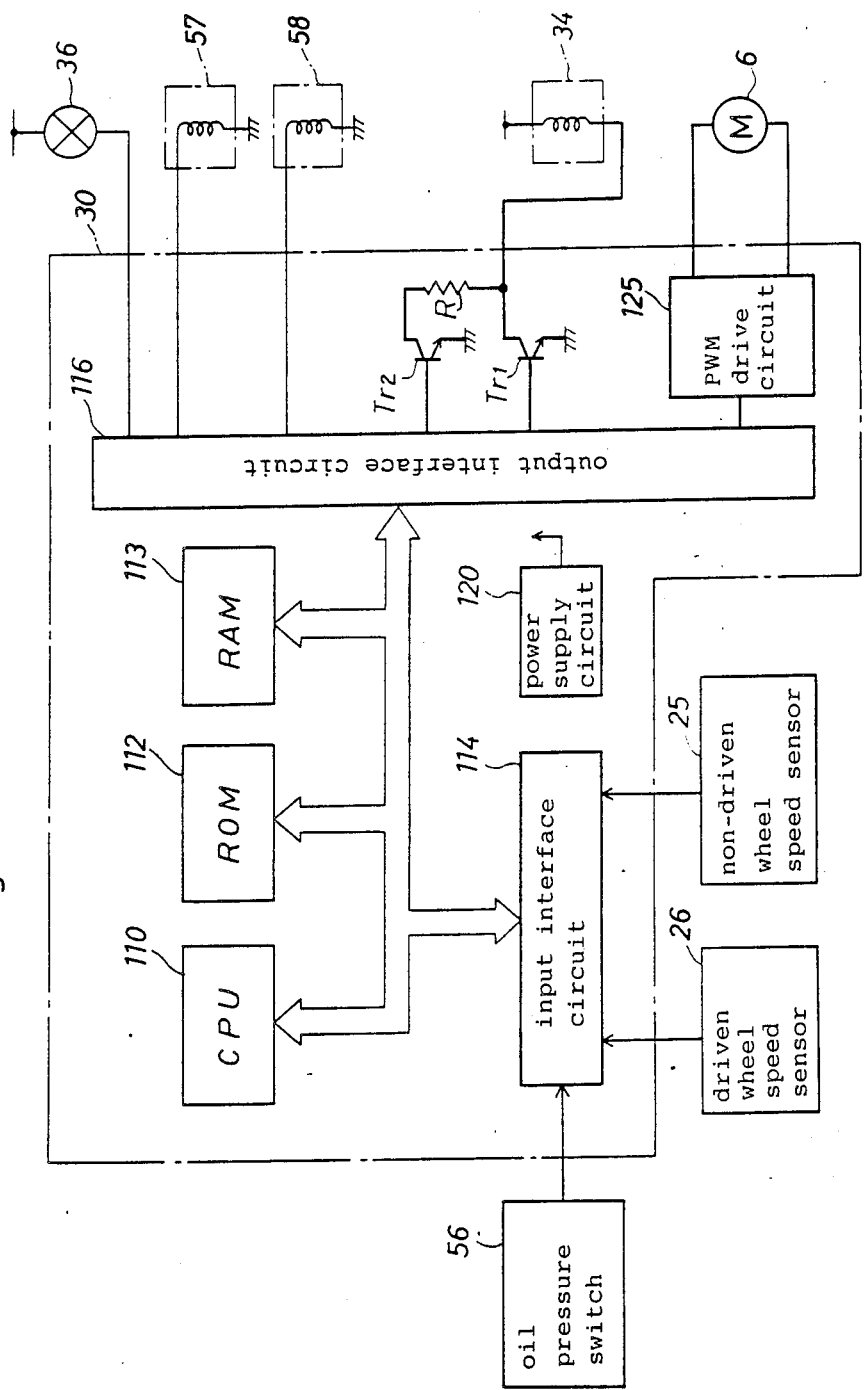
FIG. 5 is a block diagram showing the arrangement of the electronic control circuit 30 in FIG. 1 according to the second embodiment.

Next, the second embodiment of this invention will be described. The second embodiment is intended to control the hydraulic systems and associated devices similar to those of the first embodiment shown in FIG. 2 through an electronic control circuit 30 which is in this case constituted mainly by a microcomputer as shown in FIG. 5. The control is executed according to the flowchart shown in FIGS. 6 (A) and (B). The arrangement of FIG. 5 includes a central processing unit (CPU) 110 which is programmed to receive the sensor signals from the driven wheel speed sensor 26, non-driven wheel speed sensor 25 and oil pressure switch 56, and perform various calculations in response to these input signals. Other circuit components included are a read-only memory (ROM) 112 for storing the above-mentioned CPU control program, maps, and fixed data, a random access memory (RAM) 113 for performing reading and writing sensor input data temporarily, and calculation data, an input interface circuit 114 including waveform shaping circuits and a multiplexer for supplying sensor input signals selectively to the CPU 110, an output circuit 116 for driving the oil pump 36, M/C up-pressure valve 57 and PS up-pressure valve 58 and also driving the 3-position valve 34 through transistors Tr1 and Tr2, and a bus line for providing data communication between the CPU 110, ROM 112, RAM 113, and input/output interface circuits 114 and 116, and a power supply circuit 120 for all of the above circuit components.

In addition, the 3-position valve 34 and the motor 6 are constituted so as to be driven by the output circuit interface circuit 116 via transistors Tr1 and Tr2, a power restricting resistor R and PWM drive circuit 125 which conducts pulse width modulation respectively.

The traction control operation which is carried out together with anti-skid control on a time division basis by the electronic control circuit 30 arranged as described above will be described in connection with the flowchart shown in FIGS. 6 (A) and (B).

Figure 6A:
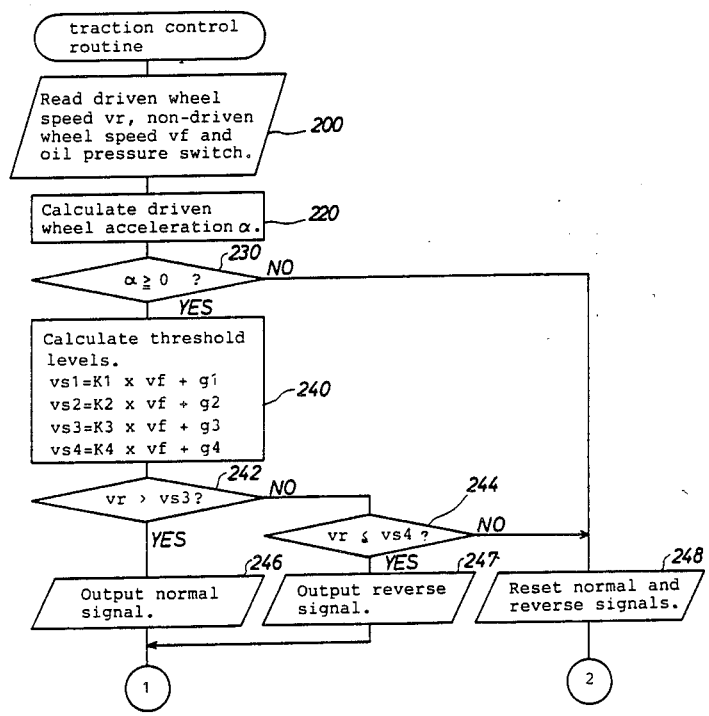
FIG. 6(A) and (B) are flowcharts showing, as an example, the control operation of the second embodiment.
Figure 6B:
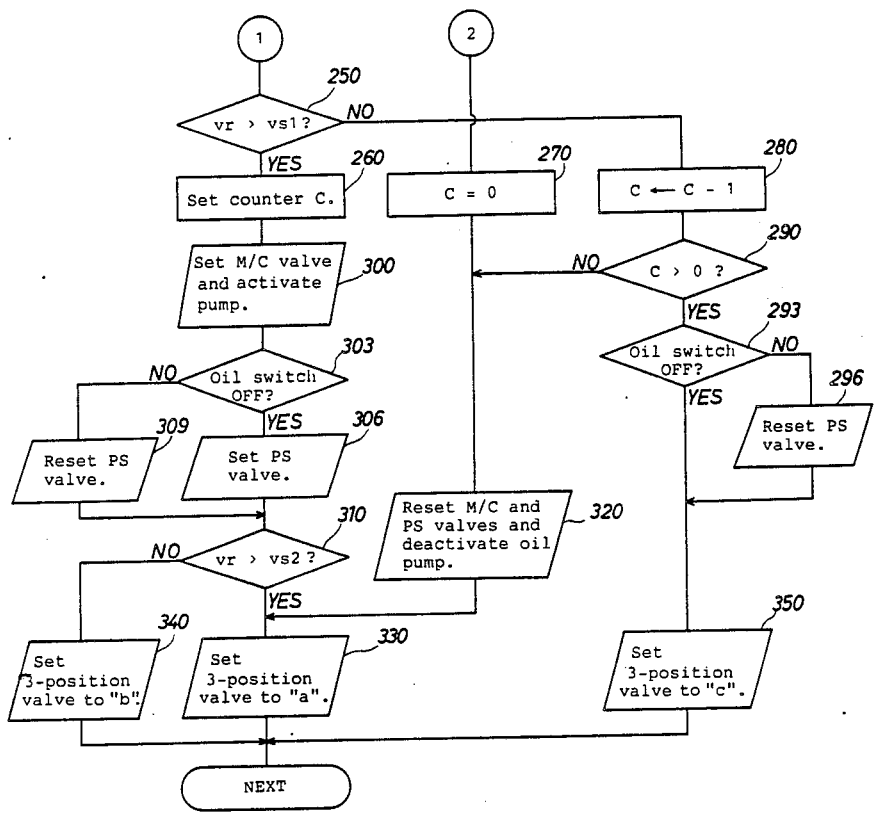

Though the flowcharts are drawn separately in the form of FIGS. 6 (A) and (B) due to the size of the drawing, a series of process is performed consistently. The routine of this traction control is performed every predetermined period together with the anti-skid control, etc. The process of every step will be described hereafter.

Step 200: Read input data on the input interface circuit 114 of the driven wheel speed vr from the driven wheel sensor 26, the non-driven wheel speed vf from the non-driven wheel sensor 25, and the switch state from the oil pressure switch 56.

Step 220: Perform differentiation process for the driven wheel speed vr to obtain acceleration α of the driven wheels.

Step 230: Test whether the driven wheel acceleration is above zero (acceleration).

Step 240: Calculate the slip threshold levels vs1, vs2, vs3 and vs4 from the non-driven wheel speed vf using predetermined constants K1, K2, K3, K4 (K2>K3>K4>K1), g1, g2, g3 and g4 as follows.

$$vs1 = K1 \times vf + g1$$

$$vs2 = K2 \times vf + g2$$

$$vs3 = K3 \times vf + g3$$

$$vs4 = K4 \times vf + g4$$

Step 242: Determine whether the driven wheel speed is above the third slip threshold level vs3 or not.

Step 244: Determine whether the driven wheel speed is equal or below the fourth slip thereshold level vs4 or not.

Slip 246: Output the normal signal via the output interface circuit 116 so as to control the position of the second throttle valve 7 toward the full close position by operating the motor 6 with the PWM drive circuit 125 in normal rotation.

Step 247: Output the reverse signal via the output interface circuit 116 so as to control the position of the throttle valve 7 toward the full open position by operating the motor 6 with the PWM drive circuit 125 in opposite rotation.

Step 248: Reset the output of the normal and the reverse signals mentioned above.

Each step of the flowchart shown in FIG. 6 (A) has been explained above and that in FIG. 6 (B) will be described below.

Step 250: Test whether the driven wheel speed vr is higher than the first threshold level vs1.

Step 260: Set a predetermined value to the counter C in the CPU.

Step 270: Reset the counter C to zero.

Step 280: Decrement the counter C by one.

Step 290: Test whether the content of counter C is above zero. The counter C used in the steps 260-290 is actually a programmed operation substituting the delay circuit 89 in the first embodiment, and its purpose is to continue traction control for a preset time length when the speed vr of driven wheels 16 and 17 has fallen below the first threshold level vs1 after traction control had been commenced.

Step 293: Test whether the oil pressure switch 56 is OFF. If the switch is OFF, indicating the steering operation being inert and the power steering hydraulic pressure not being increased, the sequence proceeds to step 350.

Step 296: If the oil pressure switch 56 is found ON in step 293, indicating the steering operation, the PS up-pressure valve 58 is reset to position h.

Step 300: Set or hold the M/C up-pressure valve 57 in the power steering hydraulic system 24 to position f, and activate the oil pump 36.

Step 303: Test whether the oil switch 56 is OFF.

Step 306: If the oil pressure switch 56 is OFF, switch the PS up-pressure valve 58 to position i so as to increase the oil pressure conducted to the sub-master cylinder 13.

Step 309: If the oil pressure switch 56 is ON, switch the PS up-pressure valve 58 to position h.

Step 310: Test whether the driven wheel speed vr is higher than the second threshold level vs2

Step 320: Reset or hold the M/C up-pressure valve 57 and PS up-pressure valve 58 to positions e and h, respectively, and deactivate the oil pump 36.

Step 330: Set or hold the 3-position valve 34 in the anti-skid hydraulic system 23 to position a (increase pressure).

Step 340: Set the 3-position valve 34 to position b (hold pressure).

Step 350: Set the 3-position valve 34 to position c (decrease pressure).

According to this embodiment, as shown in FIG. 7, (A) When the driven wheels 16 and 17 are found accelerating ($\alpha = 0$), i.e., an affirmative decision made by step 230, the control operation takes place as follows.

(1) When the driven wheel speed vr has exceeded the third slip threshold level vs3 based on the non-driven wheel speed vf, i.e., an affirmative decision made by step 242, the motor 6 is operated in normal rotation so as to control the position of the second throttle valve 7 toward the full close position and the intake air amount of the internal combustion engine 1 is decreased so as to control the output (See period CL in FIG. 7).

(2) When the driving wheel speed vr has fallen below the fourth slip threshold level vs4 by the control mentioned in (1) or (5) hereafter, i.e., an affirmative decision made by step 244, the motor 6 is operated in opposite rotation so as to control the second throttle valve 7 toward the full open position and the intake air amount of the internal combustion engine 1 is increased so as to increase the output (See period OP in FIG. 7).

(3) When the relation of the driven wheel speed vr and the fourth slip thereshold level is vs4 < vr < vs3, i.e., a negative decision made by both steps 242 and 244, both the normal and the reverse signals are reset so as to hold the position of the second throttle valve 7.

(4) When the driven wheel speed vr has exceeded the first thereshold level vs1 based on the non-driven wheel speed vf, i.e., an affirmative decision made by step 250, the oil pump 34 in the anti-skid hydraulic system 23 is activated, the M/C up-pressure valve 57 in the power steering hydraulic system 24 is set to position f, and the 3-position valve 34 in the anti-skid hydraulic system 23 is set to position b (hold pressure). (See period I in FIG. 7.)

In the above operation, if the oil pressure switch 56 is OFF, the PS up-pressure valve 58 is set to position i (steps 303 and 306), or if the oil pressure switch 56 is ON, the PS up-pressure valve 58 is set to position h (steps 303 and 309).

(5) When the driven wheel speed vr has exceeded the second threshold level vs2, i.e., an affirmative decision made by step 310, the 3-position valve 34 is set to position a (increase pressure) so as to increase the braking force of the driven wheels. (See period II in FIG. 7.)

(6) Following the above state (4) or (5), when the driven wheel speed vr has fallen below the first threshold level vs1, i.e., a negative decision made by step 250 and an affirmative decision made by step 290, the 3-position valve 34 is set to position c (decrease pressure) so as to reduce the braking force. (See period III in FIG. 7.) At this time, if the oil pressure switch 56 is found ON, the PS up-pressure valve 58 is reset to position h (steps 293 and 296).

(7) When the time length set in the counter C has expired (a negative decision made by step 290), while the driven wheel speed vr staying below the first threshold level vs1, the M/C up-pressure valve 57 and PS up-pressure valve 58 are set to positions e and h, respectively, the oil pump 34 is deactivated, and the 3-position valve 34 is switched to position a (increase pressure) to complete the traction control operation (the period not shown in FIG. 7.)

(B) If the vehicle acceleration $\alpha$ falls below zero, i.e., deceleration begins, (a negative decision made by step 230), the counter C is reset to zero, and the same control as above (4) takes place. (See period IV in FIG. 7.)

Accordingly, this embodiment performs identically to the first embodiment and has the same effects as those of the first embodiment, for example, the quick response achieved by the anti-skid hydraulic system 23, the reduction of fuel consumption by the second throttle valve 7, etc. and moreover, the use of the CPU 110 allows various schemes of traction control without changing the hardware structure of the electronic control circuit 30.

What is claimed is:

1. A wheel slip control system for a vehicle comprising:
pressure source selection means, responsive to a first pressure of a first pressure source and a second pressure of a second pressure source, for measuring a difference between said first and second pressures, and for selecting one of said first and second pressure sources in response to said measured pressure difference;

brake slip detection means for sensing a state of slippage of a wheel during a braking operation of the vehicle, and for providing a brake slip signal representative of the state of slipping;

acceleration slip detection means for further sensing said state slipping of said wheel during an accelerating operation of the vehicle, and for providing an acceleration slip signal representative of said state of slipping;

first and second throttle valves, said first throttle valve connected to an acceleration increasing structure, and said first and second throttle valves located in an air intake path;

control means, responsive to said brake slip signal, for providing a first adjustment signal responsive to said acceleration slip signal for providing said first adjustment signal to cause the driven wheel speed to be within a first predetermined range, and responsive to said acceleration slip signal for providing a second adjustment signal to a driving means for driving said second throttle valve to cause the driven wheel speed to be within a second predetermined range; and slip control means connected to said pressure source selection means responsive to said first adjustment signal from said control means for adjusting the pressure from said pressure source selection means, and responsive to said first adjustment signal from said control means for adjusting the second pressure to said pressure source selection means, thereby suppressing a slippage of wheels.

2. A wheel slip control system according to claim 1, wherein said first pressure source comprises a brake pedal and a master cylinder producing said first pressure in response to the displacement of a brake pedal structure.

3. A wheel slip control system according to claim 1, wherein said second pressure source comprises a power steering control pressure means, a switch valve connected to said power steering control pressure means for adjusting a pressure thereof, and submaster cylinder means, connected to said switch valve, for supplying said second pressure to said pressure source selection means.

4. A wheel slip control system according to claim 1, wherein said pressure source selection means comprises a change valve responsive to a difference between said first and second pressures for selectively supplying one of said first and second pressure sources.

5. A wheel slip control system according to claim 1, wherein said slip control means comprises an anti-skid control pressure means, including a three-position valve which operates on pressure from said pressure source selection means, for holding, decreasing, and increasing said pressure selectively in accordance with said first adjustment signal.

6. A wheel slip control system according to claim 1, wherein said brake slip detection means and said acceleration slip detection means comprise a driven wheel speed sensor and a non-driven wheel speed sensor.

7. A wheel slip control system according to claim 5, wherein said control means activates said three-position valve to: (1) decrease the pressure in response to said driven wheel speed falling below a lower limit of said first predetermined range, (2) increase the pressure in response to said driven wheel speed rising above an upper limit of said first predetermined range, and (3) hold the pressure in response to said driven wheel speed remaining in said first predetermined range.

8. A wheel slip control system according to claim 5, wherein said control means is also responsive to said second predetermined range having an upper limit and a lower limit, for controlling said second throttle valve from the full open to the full closed position when said driven wheel speed rises above said upper limit and from the full closed to the full open position when the driven wheel speed falls below said lower limit.

9. A wheel slip control system according to claim 8, wherein said first predetermined range includes levels which are higher than levels of said second predetermined range.

* * * * *